United States Patent [19]

Pernicka et al.

[11] Patent Number: 5,500,503

[45] Date of Patent: Mar. 19, 1996

[54] SIMULTANEOUS LASER CUTTING AND WELDING OF METAL FOIL TO EDGE OF A PLATE

[75] Inventors: John C. Pernicka, Fort Collins; David K. Benson; C. Edwin Tracy, both of Golden, all of Colo.

[73] Assignee: Midwest Research Institute, Kansas City, Mo.

[21] Appl. No.: 285,700

[22] Filed: Aug. 4, 1994

[51] Int. Cl.⁶ .......................... B23K 26/00; B23K 26/02
[52] U.S. Cl. .................. 219/121.64; 219/121.63; 52/788.1
[58] Field of Search ................... 219/121.63, 121.64; 52/785, 791, 783.1, 788.1

[56] References Cited

U.S. PATENT DOCUMENTS

| | | |
|---|---|---|
| 4,117,300 | 9/1978 | Ricards . |
| 4,500,382 | 2/1985 | Foster . |
| 4,533,814 | 8/1985 | Ward . |
| 4,546,230 | 10/1985 | Sasaki et al. . |
| 4,564,736 | 1/1986 | Jones et al. . |
| 4,798,931 | 1/1989 | Hess, III . |
| 4,905,310 | 2/1990 | Ulrich . |
| 4,945,203 | 7/1990 | Soodak et al. . |
| 5,013,275 | 5/1991 | Kautz ......................... 445/30 |
| 5,096,518 | 3/1992 | Fujikawa et al. .............. 156/89 |
| 5,157,893 | 10/1992 | Benson et al. . |
| 5,187,967 | 2/1993 | Singh et al. . |
| 5,250,783 | 10/1993 | Nishi et al. ................. 219/121.64 |
| 5,318,108 | 6/1994 | Benson et al. ............... 165/96 |

FOREIGN PATENT DOCUMENTS

| | | | |
|---|---|---|---|
| 58-212887 | 12/1983 | Japan | ............... 219/121.64 |
| 60-96382 | 5/1985 | Japan | ............... 219/121.64 |
| 61-279385 | 12/1986 | Japan | ............... 219/121.64 |

Primary Examiner—Geoffrey S. Evans
Assistant Examiner—J. Pelham
Attorney, Agent, or Firm—Edna M. O'Connor

[57] ABSTRACT

A method of welding an ultra-thin foil to the edge of a thicker sheet to form a vacuum insulation panel comprising the steps of providing an ultra-thin foil having a thickness less than 0.002, providing a top plate having an edge and a bottom plate having an edge, clamping the foil to the edge of the plate wherein the clamps act as heat sinks to distribute heat through the foil, providing a laser, moving the laser relative to the foil and the plate edges to form overlapping weld beads to weld the foil to the plate edges while simultaneously cutting the foil along the weld line formed by the overlapping beads.

26 Claims, 2 Drawing Sheets

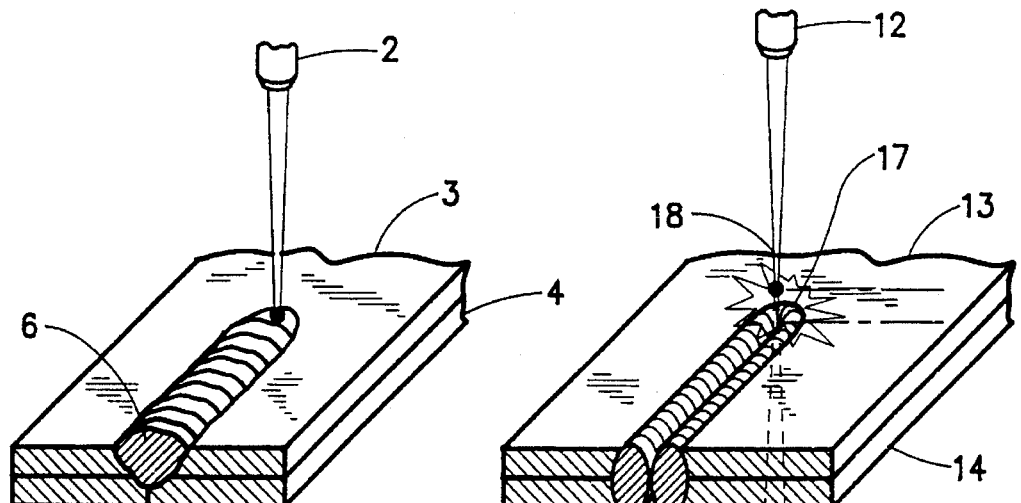
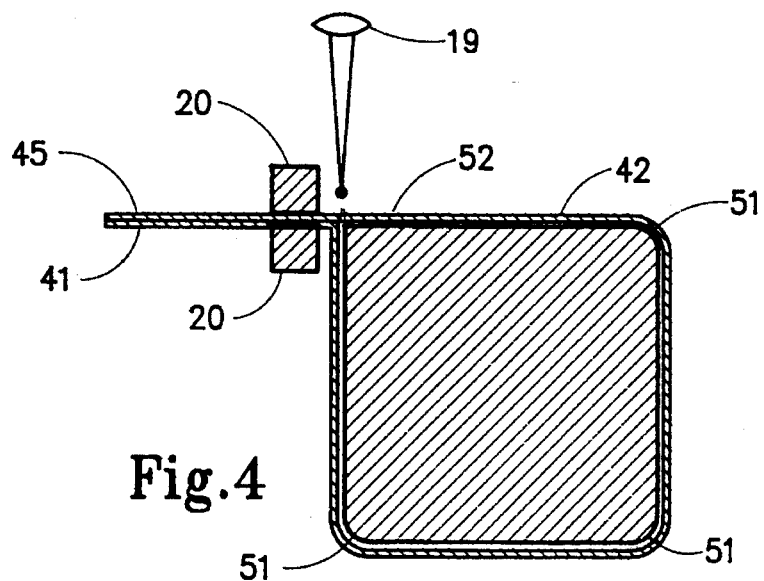
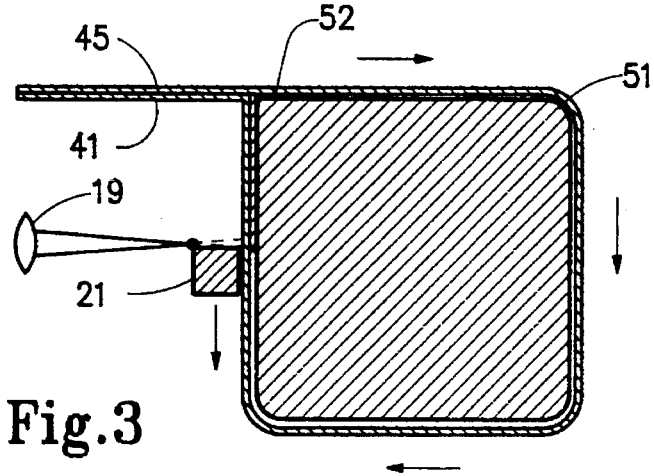

SIMULTANEOUS LASER CUTTING AND WELDING OF METAL FOIL TO EDGE OF A PLATE

The United States Government has rights in this invention under Contract No. DE-AC36-83CH10093 between the United States Department of Energy and the National Renewable Energy Laboratory, a division of the Midwest Research Institute.

BACKGROUND OF THE INVENTION

The instant invention is directed to a method for laser welding a very thin metal foil to the edge of a metal sheet to achieve a seal, even under vacuum conditions. The method is specifically directed to the welding of very thin metal foils which are less than 0.002 inches thick to such metal sheet. Using the teachings of the instant invention the ultra-thin metal foils are welded to the metal sheet using a laser cutting and welding operation. That is, the foil is welded while it is simultaneously cut and trimmed by a laser such as that of the Neodymium: YAG type. The invention further contemplates using such a method to manufacture a sealed vacuum insulation panel where the use of thin foils is required to minimize thermal conductance.

It is well recognized that the welding of metal foils having a thickness of less than 0.002 inches cannot be achieved using laser welding methods. In fact, the prior art specifically teaches away from using a laser to achieve such welding of very thin metal. For example, U.S. Pat. No. 4,798,931, to Hess, III directed to "Simultaneously Cutting and Welding Sheet Metal Using Laser Energy", specifically states that the laser welding method of the patent will not operate with extremely thin layers, and the patent is directed to metals with a range of thickness from 0.002 to 0.010 inches thick. Other prior patents recognize the difficulties encountered by welding even thicker metals. U.S. Pat. No. 4,546,230 to Sasaki displays graphically that the "welding of metal pieces is difficult unless the thickness thereof is 0.2 mm (0.008 inches) or above, (column 5). Similarly, U.S. Pat. No. 4,905,310 to Ulrich recognizes that a laser cannot be used to weld and cut very thin sheets and foils of metal because "such extremely thin layers may vaporize and/or curl and not function properly", (column 5).

Electrical resistance welding processes have also been used for the welding of thin metal, however, such a method has proved suitable for metals of 0.003 inches or greater. Also, it is believed that laser techniques would prove to be more economic than electrical resistance welding and more able to provide a thicker, stronger, vacuum-tight, or error free weld in metal foils.

In the past, laser technology has been used with plastic and resin films. Such films have been simultaneously cut and welded using laser techniques. Although a laser has been successfully used with such materials, it is not suggested in the prior art that the successful welding and cutting of very thin metal foils can be achieved by using similar methods. U.S. Pat. No. 4,945,203 to Soodak et al is an example of the use of a laser to simultaneously cut and weld plastic film bags. The reference uses a carbon-dioxide type laser to weld Teflon brand films having a thickness on the order of 0.001 inch to 0.10 inch. Even with the knowledge of the Soodak et al reference, it is well known that the success of the method is limited to plastic type of material and would not be successfully extended to very thin metals or foils. Plastic materials have physical and chemical properties which are extremely different from metals. Plastics, for example, can be cut and welded in air at relatively low temperatures, whereas metals must be heated to above their generally very high melting temperatures in order to accomplish a weld.

Similarly, the U.S. Pat. No. 4,500,382 to Foster describes a method for simultaneously cutting resin film to the desired shape while simultaneously welding the edges. Again the prior art recognizes that such a method does not extend to very thin metal foils and teaches away from using such a method with ultra-thin metal material.

Neodymium: YAG lasers and other solid state lasers, such as that used in the process of the instant invention, are well known and have been used for welding and cutting. U.S. Pat. No. 4,461,945 to Ward shows the use of a laser for such a purpose. However, the reference does not disclose the use of the laser for the simultaneous cutting and welding of very thin or ultra-thin metal foils to a metal sheet. U.S. Pat. No. 4,564,736 discloses the use of a Neodymium: YAG laser in cutting, drilling, and welding processes, and U.S. Pat. No. 5,187,967 also discloses the use of a Neodymium: YAG laser for cutting. Again, none of the above cited patents utilize such a solid state laser for the simultaneous welding and cutting of very thin metal foils to a metal sheet. None of the references recognize that such a procedure can be achieved with a pulsed Neodymium: YAG laser.

It is recognized that simultaneous cutting and welding can be achieved utilizing laser technology. As noted above, both U.S. Pat. No. 4,500,382 to Foster, and U.S. Pat. No. 4,945,203 to Soodak disclose such a process with respect to resins or thin plastics although a vacuum fight weld or seal is not achieved. Likewise, simultaneous cutting and welding of metals is disclosed by U.S. Pat. No. 4,798,931 to Hess III, and U.S. Pat. No. 4,905,310 to Ulrich. The Hess III, and Ulrich patents, however teach that such methods do not work with very thin metals or foils.

Specifically, the Hess III, and Ulrich patents do not use a Neodymium: YAG laser, but rather a carbon-dioxide laser as is well known. The two patents disclose a method which "depends upon the creation of a globule or pool of molten metal, some of which is blown away and the remainder of which is used to weld". The patents prefer space between the layers in a controlled manner, and rely on this space for correct operation of the method. A narrow jet of air or inert gas is also required by the references to blow away some of the molten metal although some is left at the laser site. The spacing between the two metals to be welded is such that a globule of molten metal will bridge the gap and form a weld. In these two patents the focal point of the laser is set to be at the surface of the work, or below the surface. The patents suggest that for relatively thin materials, the focal point be set at the surface of the work. The preferred embodiment of the patents is concerned with the welding of 321 stainless steel with a thickness of either 0.006 inches or 0.004 inches. No disclosure is made of an effective method for welding foils with a thickness of less than 0.002 inches.

As will be seen from the following description, the process of the instant invention varies from that of the Hess HI and Ulrich patents to satisfy a long felt need and to achieve an improved and unexpected result.

The instant invention is directed to the use of an ultra-thin metal foil to seal between two metal plates while forming a vacuum insulation panel. Prior art insulation is shown in U.S. Pat. No. 5,157,893 to Benson et al. The panel comprises two adjacent metal sheets spaced close together with beads or spacers there between. Gases are evacuated from the panel to form a vacuum In the prior art device the edges of the metal plates were sealed together. It has been found that the instant invention provides a method for manufacturing such panels with ultra-thin foil as an edging between the plates. The thin metal foil edge seals greatly improve the thermal insulating performance of the panels by reducing the thermal conductance between the hot side and the cold side of the insulation.

Welding has also been used for sealing purposes as shown in U.S. Pat. No. 4,117,300 to Ricards. The patent is directed to a method of hermetically sealing battery containers. The method of Ricards uses both a resistance weld and a laser weld. The patent, however, is not directed to the use of ultra-thin foils and the problems associated therewith.

SUMMARY OF THE INVENTION

It is an object of the instant invention to provide a method for welding a very thin or ultra-thin metal foils to the edge of a metal sheet, wherein the very thin foil has a thickness less than 0.002 inches.

It is a further object of the invention to provide a method for forming a compact vacuum insulation panel without pinhole or other leaks to preserve vacuum integrity.

The instant invention relates to the method of simultaneously cutting and welding a very thin metal foil about the periphery of a vacuum insulation panel. The method is suitable for use with foils having a thickness of less than 0.002 inches. The foil is welded to the ends of the two metal sheets forming the panel to seal the edges of the vacuum panel.

The method of the present invention for simultaneously cutting and welding a very thin or ultra-thin metal foil to a sheet comprises clamping the ultra-thin metal foil to the edge of the metal sheet, providing a pulsed Neodymium: YAG laser or other suitable laser, providing suitable optics for focusing the laser on the foil to be cut and welded so that the focal point of the laser is above the surface of the ultra-thin foil, pulsing the laser at specific speed and power settings to melt back material ahead of the laser path, and to partially solidify the melt between pulses of the laser, wherein the foil is welded to the edge of the metal sheet to form a strong, flawless, vacuum-tight seal.

A method is also provided for making a vacuum panel utilizing the laser welding and cutting techniques of the instant invention. The method includes providing two metal sheets having at least one 90 degree corner. The two metal sheets are placed parallel to each other with an open cavity containing spacers therebetween. A very thin or ultra-thin metal foil is provided to surround the edge periphery of the two metal sheets, as well as enclose the cavity therebetween. The foil is attached at the 90 degree corner while leaving an excess leading portion preceding the initial attachment of the very thin foil to the metal sheet. The method includes welding the thin foil to each of the metal sheets while simultaneously trimming excess foil. The foil is provided with a second excess or trailing portion at the same 90 degree corner which is welded to and trimmed with the leading portion to seal the cavity between the two plates.

BRIEF DESCRIPTION OF THE DRAWINGS

FIG. 1 is a perspective view of a welding technique for welding metal sheet in accordance with prior art method.

FIG. 2 is a perspective view of the welding and cutting operation showing overlapped weld beads achieved by using the laser method of the instant invention.

FIG. 3 is a top view in cross section showing the laser welding of ultra-thin metal foil to the edge of the metal sheet of a vacuum insulation panel.

FIG. 4 is a top view in cross section also showing the further laser welding of ultra-thin metal foil at the corner of a vacuum insulation panel in accordance with the method of the instant invention.

DETAILED DESCRIPTION OF THE PREFERRED EMBODIMENT

Figure 5:
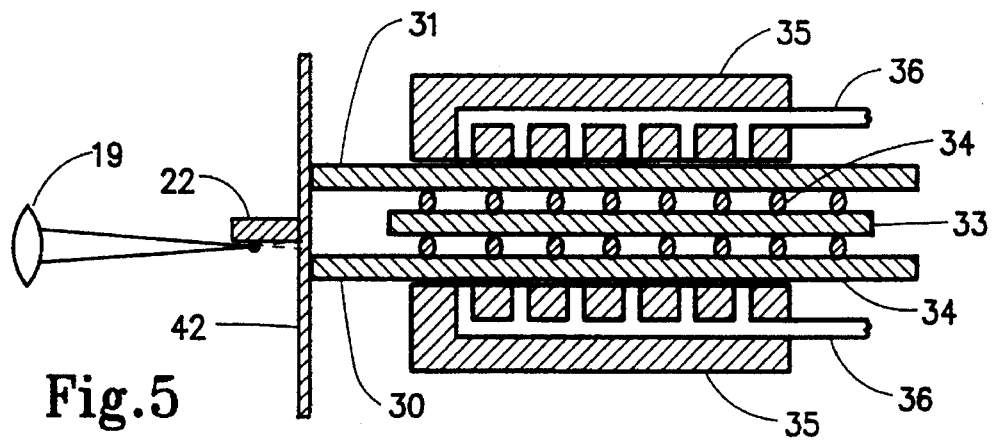
FIG. 5 is a cross-sectional view showing the vacuum chamber of the panel to be constructed in accordance with the instant invention and the use of a clamping fixture during welding of the ultra-thin metal foil to the edges of the sheet of a vacuum insulation panel.

Prior art methods for laser welding ultra-thin metal foils of the type used in the instant invention typically produce a weld pool such as shown at 6 in prior art FIG. 1. In this method, the laser 2, typically of the carbon-dioxide type, is used to weld metal sheets 3 and 4 together. The depth of the weld pool is difficult to maintain greater than the thickness of one sheet but less than the thickness of both sheets. A weld pool which penetrates both sheets can become a hole when the surface tension of the weld pool draws the liquid metal away from the weld area. In the past, in order to weld thin sheets, globules or portions of the pool have been blown away using narrow jets of air or gases while leaving sufficient molten metal to form the weld. This method has not been shown to be effective for ultra-thin foils (foils under 0.002 inches in width).

The present method also utilizes a laser 12 to weld an ultra-thin foil. Use of such foils are important in forming a vacuum insulation panel. Ultra-thin metal foil edge seals reduce the thermal conductance between the hot side and cold side of the panel.

The method of the instant invention utilizes the laser to simultaneously cut and weld the ultra-thin metal foils. In the present case unique fixturing or clamping is provided for pronounced weld bead formation. The process forms overlapped weld beads and such weld bead formation is illustrated generally by FIG. 2 (showing the welding of two ultra-thin foils). The laser (shown at 12) is moved relative to the foils to simultaneously cut and weld the foils to form channel 21. The laser 12 moves with precise speed and power to melt back material 17 ahead of the laser path, which material partially solidifies between pulses of the laser. The depth of penetration of the weld pool is not significant and the surface tension of the foils is sufficiently favorable to form bead 16. The beads are larger than the cut areas of the foils to assure a tight seal without pinholes or defects.

The instant invention is concerned with welding an ultra thin foil 42 to relatively thick metal plates, as shown in FIG. 5. A laser, such as that shown at 12, with suitable optics 19 is directed to simultaneously cut and weld the ultra-thin metal foil 42.

To provide this precise of a cut and weld, a pulsed Neodymium: YAG laser is preferred although other solid state lasers can also be used. Prior art carbon-dioxide lasers will not provide the precision required for the performance of the preferred method because their beam power is not absorbed by the metal as efficiently. Shorter wavelength lasers, in contrast, provide favorable heat distribution which results in favorable surface tension of the melt pool and a thickened bead formation.

The Nd:YAG laser has a pulse duration in a range from 1 msec to 10 msec and a wavelength of 1.06 µm. The laser is pulsed from 20 to 100 pulses per second. The duty cycle is chosen to allow solidification of one weld bead before the next so that an overlapping weld pool is formed by the next pulse. The average power level of the pulsed laser is typically from 20 to 100 watts. The laser is moved relative to the thin foil and metal sheet edge to be welded, at a speed from about 1 to 10 inches per minute. The welding and cutting path can be controlled by either scanning the laser beam or moving the foils through a stationary beam. Any well known mechanical moving means can be used along with the suitable electronic controls for performing the laser operation.

Other suitable lasers for performing the method include excimer lasers, argon ion lasers and dye lasers, although this list is considered to be exemplary only and not construed to limit the lasers which could be used to practice the method of the invention. Shorter wavelength lasers allow the laser beam to be optically focused to a more narrow spot size allowing for more precise adjustment and more accurate control of the thermal characteristics required for reliable welds even under vacuum conditions.

The instant invention uses auxiliary optics 19 to direct the laser beam. The focal point 18 of the laser is located above the surface of the top foil 13 as shown in FIG. 2, or above the surface of the ultra-thin foil 42 (as shown in FIG. 3, 4, and 5). This preferred location for the focal point 18 maximizes the thermal impact to the foil surface by providing more uniform and controllable thermal distribution at the weld site. Such a focus location also minimizes and controls damage to the lower side of the foil as it is trimmed in the simultaneous cutting and welding action. Also, laser energy dissipates more rapidly and safely beyond the weld area.

The process of the instant invention does not require jetting of air or gases to remove globules from the weld pool. Eliminating the jetting requirement can result in cost savings since frequently the gases used are rare and expensive. Also jetting may be injurious to a leak fight weld. To prevent oxidation, the instant process can be performed in a vacuum or a low pressure shield gas such as helium, nitrogen, or argon could be used. However, jetting of such gas could be detrimental to the achievement of a pronounced weld bead formation.

The pronounced bead formation of the instant invention results in a weld formed of weld beads which can be produced over large distances with vacuum fight integrity. The weld bead forms as one of the results of the high intensity laser causing the thin foil to melt. The heat sink clamps quickly absorb the heat to create a weld bead size larger than the foil thickness. The pulse rate and relative rate of motion between the laser beams and the foils is controlled to assure that weld beads from sequential pulses overlap each other. The foil and sheet edge is also melted slightly ahead of its contact point with the laser beam. The melt is partially solidified between the pulses of the laser to prevent uncontrolled heat build-up which can result in variable, imprecise melting pattern. Thus detrimental micro voids are prevented in the weld.

The use of heat-sink clamps also help shape the resulting weld bead by balancing the thermal factors to provide rapid cooling at the weld zone and eliminate damaging thermal stress and expansion problems. The heat sink clamps or fixturing are water cooled to dispense the heat although air cooling as well as other well known cooling methods are also contemplated.

Such features allow the ultra-thin foil to be used as peripheral edging in a vacuum insulation panel which when evacuated of air will provide a very high residence to heat transfer. Ultra-thin foil is preferable because it conforms to the edges with ease and provides little cross-sectional area through which heat may be conducted from the hot side to the cold side of the vacuum insulation panel. The procedure for attaching the thin foil is shown in FIGS. 3, 4, 5, and 7. The panel sheets used in the present invention preferably have three rounded corners (51), and one 90 degree corner (52). The rounded corners, although not essential, allow the foil to easily wrap around the outer edges of the panel without damage. The 90 degree corner is required to complete the perimeter foil seal by welding the foil to itself as in FIG. 4. The present invention contemplates using a leading portion 41 of the thin foil which is excess, and does not come into contact with the edges of the metal sheet. The weld and cut process begins at corner 52 and continues in a counter-clockwise direction to simultaneously weld and cut the foil to the top sheet edge. This is repeated for the bottom sheet edge. A trailing portion of the foil is then welded to the leading portion of the foil in corner 52 along with the lead portion and the excess trimmed.

It is noted that the cut and weld process may be terminated or started at any area of the panel or proceed in a different direction during the process as long as the outer edges of the panel are sealed.

To achieve the weld and cutting operation of the instant invention, three types of clamps or fixturing are used. The first is a vacuum chuck clamp as shown in FIG. 5. This clamp 35 with vacuum chambers 36 is used to secure the plates or sheets 34 in the proper position and to assure the sheets are parallel to each other. Support structure including spacers and other internal structure for the vacuum insulation panel is shown at 33. By evacuating the vacuum chambers, a force is exerted on the plates 34 and such force holds the plates in alignment for the addition of the thin metal foil edging. It is contemplated that other types of clamps, other than a vacuum type can be used to hold the plates.

Figure 6:
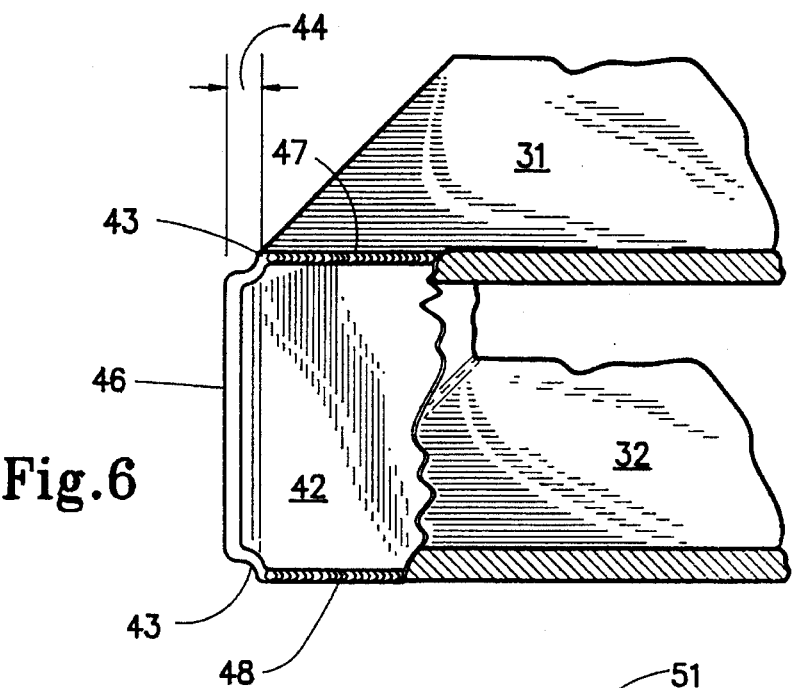
FIG. 6 is an enlarged view partially in cross section and partially cut away showing the edge welds and corner welds produced in accordance with the instant invention.
Figure 7:
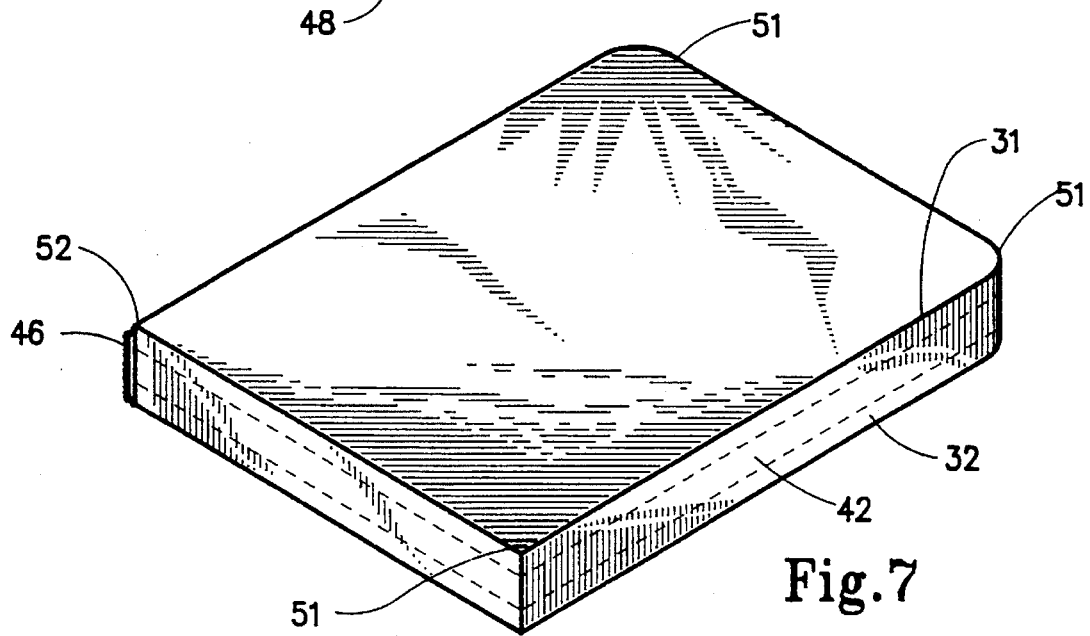
FIG. 7 is a perspective view of a vacuum panel constructed in accordance with the instant invention, with the inside edges of the top and bottom metal sheets shown in phantom.

A mobile heat sink clamp or fixture is used to secure the foil to the edge of the sheet as well as to remove excess heat. The clamp 21 can be of any known type and movable by any known means. The clamp preferably precedes the laser beam so as not to damage the resulting weld bead. The clamp will move around the peripheral edge of each plate, or sheet, to secure the foil to the edge of the top and bottom plate during the laser welding process. The clamp can roll or slide but other known methods for movement can also be used. The clamp conducts heat away from the weld site through the metal foil speeding the solidification of the weld beads (see FIG. 6). The clamp is located a distance, in a range from 0.003 inches to 0.015 inches away from the weld site. This distance is sufficiently small to be effective in conducting the heat. Movement of the laser relative to the foil forms overlapping weld beads along a continuous weld line.

Alternatively, a stationary clamp can be placed on each side of the four sides of the panel as the laser traverses such sides. The clamp shown in cross section at 22 in FIG. 5 is placed inside the weld and cut line so that the laser beam tracks along the edge of the clamp. The same clamp can be used on each side as the laser scanning is achieved in four sections. Alternatively four separate clamps can be used and positioned prior to the laser assuming its path. The clamp is repositioned depending on the sheet or plate edge to be welded. This clamp is also of the heat sink type and is also located 0.003 inches to 0.015 inches from the cut and weld site.

To achieve the proper secure corner configuration, a corner clamp 20 is used. The foil is provided with an excess leading portion 41 prior to attachment to the plate edges, as well as a second excess trailing portion 45. The corner clamp 20 secures the two edges 41 and 45 together adjacent to the 90 degree corner 52. At the corner defined by 52, the laser welds both the ultra-thin foils 41 and 45 which contact each other as well as the edge or corner 52 of the metal plates. That is, a triple joint is achieved to complete the vacuum enclosure. Such a triple joint is shown at 43 of FIG. 6. Two triple joints are formed, one at the edge of the top metal plate and one at the edge of the bottom metal plate. The weld forming the triple joint also extends into section 46 formed by the thin metal foils. The leading and trailing portions 41 and 45 are welded together. This forms an ultra-thin foil to ultra-thin foils weld adjacent to the top and bottom plates.

To form the final trim weld the laser is scanned from the top plate 31 to the bottom plate 32 in a direction perpendicular to its usual travel. This final trim weld starts and stops adjacent to the upper and lower triple joint respectively and attaches the two excess sections together to seal the double thickness foil section 46 (shown in FIGS. 6 and 7) while simultaneously cutting the excess foil. The double-thickness foil forming section 46 typically has dimension shown at 44 of approximately 0.005". Again, the clamp 20 is positioned 0.003 to 0.015 inches from the final trim weld line.

It is understood that although the preferred embodiment is described in terms of a laser moving along a path determined by the edge of the plate to be welded, only relative movement is important. That is, the plate edges can be moved while the laser remains stationary. Also the relative movement can be counter clockwise or clockwise around the plate, or the relative movement for the sides can be in different directions as determined by the manufacturing condition.

Again, any well known mechanical mechanism can be used with suitable electronic controls. This non-contact laser method for attaching a thin metal foil to the edges of the upper and lower sheets to form a vacuum tight seal can easily be performed in a vacuum. Also, the method is suited to computer control, fiber optic laser beam delivery and remote video tracking. These procedures can speed the mass production of vacuum insulation panels.

In a typical vacuum insulation panel the sheets would be formed of steel with a thickness of approximately 0.023 inches and the low thermal conductance foil edge seal would be typically formed of 0.001 inch thick steel. Tests performed on a weld between a 0.001 inch thick 304 stainless steel foil and the 0.023 inch thick edge of a 304 stainless steel sheet show the weld to be free of voids under microscopic inspection. The vacuum panel was also checked for leaks using a mass spectrometer and a helium source. No leakage of helium through the welds of the panel was detected above $5 \times 10^{-10}$ atm cc/sec. Such choice of materials is not critical, except that to minimize the thermal conductance through the vacuum insulation panel, such foil should be of a thickness less than 0.002 inches. The use of a thicker foil (such as 0.003 inches) compromise the overall effectiveness of the completed vacuum insulation panel.

Although the instant invention has been specifically described for making vacuum insulation panels, it is understood that the technology can be useful whenever it is desirable to weld an ultra-thin foil to the edge of a thicker sheet. It is also understood that the method of the instant invention can be used to weld ultra-thin foil to metal of any configuration and is not just limited to welding the foils to edges. The foregoing description is considered as illustrative only of the principles of the invention. Further, since numerous modifications and changes will readily occur to those skilled in the art, it is not desired to limit the invention to the exact construction and processes shown as described above. Accordingly, all suitable modification and equivalents may be resorted to falling within the scope of the invention as defined by the claims which follow.

We claim:

1. A method of welding an ultra-thin metal foil to the edge of a metal plate to form a vacuum tight weld comprising a) providing an ultra-thin foil having a thickness of less than 0.002 inches, b) providing at least one metal plate having a thickness greater than that of the ultra-thin foil, wherein the plate has a top surface, a bottom surface and an edge between the top and bottom surface defining the thickness of the plate, c) placing the ultra-thin foil against the edge of the plate, d) clamping the ultra-thin foil against the edge of the plate, e) providing a laser having a focused beam, f) directing the beam of the laser onto the ultra-thin foil to weld the ultra-thin foil to the edge of the plate at a weld line while simultaneously cutting the edge of the foil along one of the surfaces of the plate.

2. The method of claim 1 further comprising the step of moving the laser relative to the ultra-thin foil and the edge of the plate to weld the foil to the plate at successive overlapping locations to form a plurality of connected weld beads forming a continuous weld.

3. The method of claim 1 wherein said step of clamping further comprises providing a clamp as a heat sink to absorb heat transmitted through the foil.

4. The method of claim 3 comprising the step of locating the clamp at a distance from 0.003 inches to 0.015 inches away from the weld line of the foil.

5. The method of claim 3 comprising the step of locating the clamp along the edge to be welded.

6. The method of claim 3 comprising the step of moving the laser and the clamp relative to the foil and the edge of the plate to weld the foil to the plate edge at successive overlapping locations to form a plurality of connected weld beads forming a continuous weld.

7. The method of claim 1 further comprising the step of providing a Neodymium: YAG laser to weld the foil to the edge of the plate.

8. The method of claim 7 further comprising the step of pulsing the Neodymium: YAG laser to cut and melt the thin foil.

9. The method of claim 8 wherein the laser is pulsed from 20 to 100 pulses per second.

10. The method of claim 8 wherein the laser has a pulse width from 0.5 msec to 10 msec.

11. The method of claim 7 wherein the step of providing a Neodymium: YAG laser further comprises providing a Neodymium: YAG laser having an average power level in a range from 20 to 100 watts.

12. The method of claim 1 comprising the step of locating the focal point of the laser above the surface of the ultra-thin foil.

13. The method of claim 1 comprising
   a) providing a second metal plate having a top surface, a bottom surface, and an edge between the top and bottom surface,
   b) spacing the second plate from the first plate,
   c) placing the ultra-thin foil against the edge of the second plate,
   d) clamping the ultra-thin foil against the edge of the second plate, and
   e) directing the beam of the laser onto the ultra-thin foil to weld the ultra-thin foil to the edge of the second plate while simultaneously cutting the edge of the foil along one of the surfaces of the plate.

14. The method of making a vacuum insulation panel comprising
   a) providing a first metal plate having four corners, a top surface, a bottom surface, and an edge between the top and bottom surfaces,
   b) providing a second metal plate having four corners, a top surface, a bottom surface, and an edge between the top and bottom surfaces,
   c) placing the first plate parallel to and spaced a distance apart from the second plate,
   d) providing an ultra-thin metal foil having a thickness less than 0.002 inches,
   e) clamping the ultra-thin foil around the edges of the plates,
   f) providing a laser having a focused beam,
   g) directing the focused beam onto the ultra-thin foil to weld the ultra-thin foil to the edges of the first and second plate to form a panel which when evacuated of gases will hold a vacuum.

15. The method of claim 14 wherein the foil has a length greater than the perimeter of each plate measured along the edges and further
   a) providing the foil at one end with a first excess leading portion and at the other end with a second trailing excess portion,
   b) clamping the excess portions together with second clamps,
   c) using the laser to simultaneous weld the excess portions together while cutting any excess therefrom along a first weld.

16. The method of claim 15 further comprising welding the excess portions together and to the edges of the plates to form a second weld spaced from the first weld.

17. The method of claim 15 wherein said second clamp acts as heat sink to distribute heat from the foil.

18. The method of claim 15 wherein said step of clamping comprises providing at least one clamp and wherein said clamp acts as a heat sink to absorb heat from the foil.

19. The method of claim 14 comprising the step of moving the laser relative to the foil and edges to provide weld beads at successive overlapping locations while forming a continuous weld line.

20. The method of claim 19 further providing at least one clamp to clamp the foil to the edges of the plates during welding and wherein the said clamp is located at a distance in a range from 0.003 to 0.015 inches away from the center of the weld line.

21. The method of claim 14 wherein the laser is a Neodymium: YAG laser.

22. The method of claim 14 wherein each plate has at least three rounded corners.

23. The method of claim 15 wherein each plate has one squared corner aligned over the square corner of the other plate, and wherein said excess portions are welded at the square corner.

24. The method of claim 15 wherein the second clamps are located 0.003 to 0.015 inches from the weld.

25. The method of welding an ultra-thin foil to the edge of a metal plate comprising
   a) providing an ultra-thin foil having a thickness of less than 0.002 inches,
   b) providing at least one metal plate having a thickness greater than that of the ultra-thin foil, wherein the plate has a top surface, and a bottom surface, and an edge between the top and bottom surface defining the thickness of the plate,
   c) placing the ultra-thin foil against the edge of the plate,
   d) clamping the ultra-thin foil against the edge of the plate,
   e) providing a laser having a focused beam,
   f) directing the beam of the laser onto the ultra-thin foil to melt the ultra-thin foil to form weld beads and to weld the foil to the edge of the plate, wherein the weld beads have a thickness greater than the thickness of the foil while simultaneously cutting the edge of the foil along one of the surfaces of the plate.

26. The method of claim 25 further comprising the step of moving the laser relative to the edge and the foil to form a series of overlapping weld beads to weld the foil to the plate edge.

* * * * *